Sept. 14, 1965   W. C. KURVINK   3,206,244

SUN VISOR EXTENSION

Filed May 1, 1963

William C. Kurvink
INVENTOR.

BY *Clarence A. O'Brien*
and *Harvey B. Jacobson*
Attorneys 3,206,244
SUN VISOR EXTENSION
William C. Kurvink, 1539 6th St. NE., Auburn, Wash.
Filed May 1, 1963, Ser. No. 277,310
2 Claims. (Cl. 296—97)

This invention relates to new and useful improvements in motor vehicle sun visor extensions or attachments and has for its primary object to provide, in a manner as hereinafter set forth, unique means for substantially eliminating or materially reducing glare and heat from various sources at or below eye level without objectionable vision impairment.

Another important object of the present invention is to provide an improved glare and heat shield of the character described which is adapted to be readily adjusted to different positions to meet various conditions, including side glare.

A further object is to provide an anti-glare shield of the aforementioned character which may be expeditiously mounted for use on various types, sizes and shapes of conventional sun visors without structurally modifying said visors.

Still another important object is to provide an anti-glare shield of the character set forth which is adapted to be readily secured in an inoperative or out-of-the-way position beneath the sun visor when said shield is not in use.

Another object is to provide, in a glare shield comprising a tinted transparent or translucent panel, novel means for pivotally attaching said panel for free swinging movement to the visor adjacent to the free longitudinal edge of the visor.

A still further important object of the present invention is to provide a glare shield of the character described wherein the same elements which pivotally attach the panel to the visor are utilized for securing said panel in inoperative position on said visor.

Another object is to provide a glare shield of the character described wherein the panel, when in an inoperative position, is secured on the underside of the visor whereby the accumulation of dust, etc., thereon will be prevented.

Another object is to provide a glare shield wherein the panel mounting means may, if desired, be utilized for securing cards, maps, papers, etc., on top of the visor.

Other objects are to provide a glare shield attachment for vehicle sun visors which is comparatively simple in construction, strong, durable, compact, of light weight, attractive in appearance and which may be manufactured at low cost.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figure 1:
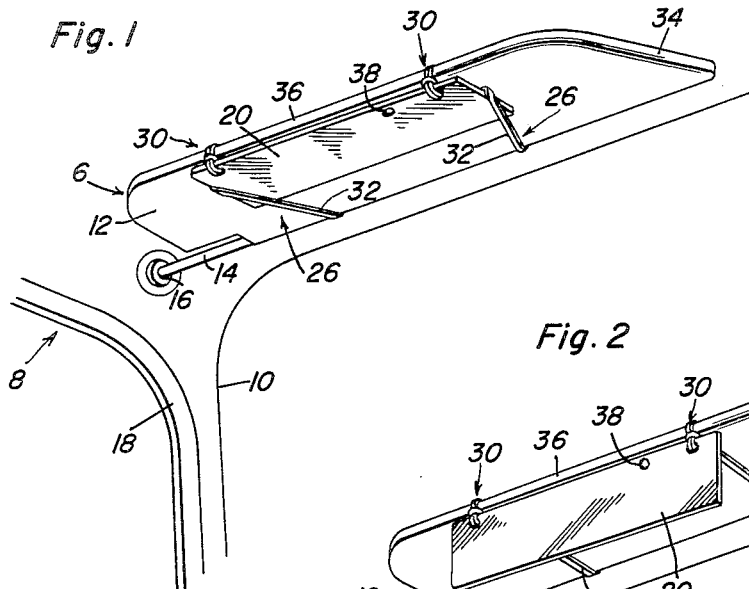
FIGURE 1 is a perspective view, showing a glare shield embodying the present invention in inoperative position beneath a motor vehicle sun visor.
Figure 2:
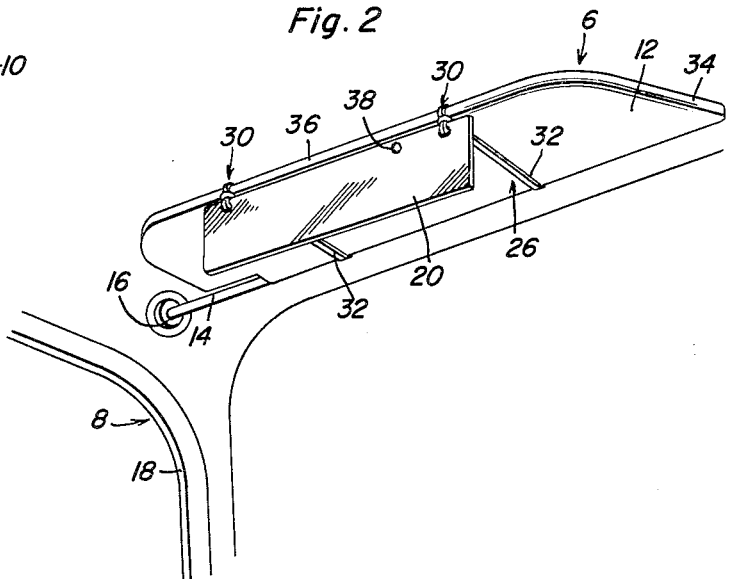
FIGURE 2 is a perspective view substantially similar to FIGURE 1 but showing the glare shield in operative position.
Figure 3:
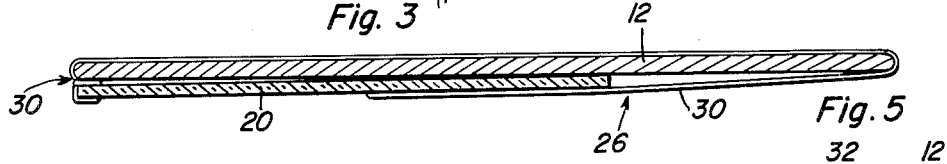
FIGURE 3 is a cross-sectional view through an end portion of the visor, showing the glare shield in folded or inoperative position therebeneath.
Figure 5:
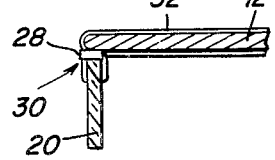
FIGURE 5 is a fragmentary view in vertical section showing the method of connecting the panel to the visor.
Figure 4:
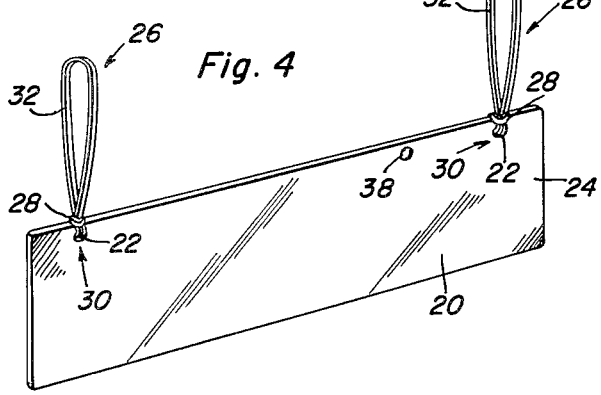
FIGURE 4 is a perspective view of the glare shield per se.

Referring now to the drawing in detail, it will be seen that reference numeral 6 designates a conventional sun visor mounted in a motor vehicle 8 above the windshield 10 thereof. Toward this end, the sun visor 6 includes the usual elongated panel 12 having one of its longitudinal edge portions journaled for swinging adjustment on a supporting rod or arm 14. The arm or rod 14, in turn, is mounted for horizontal swinging adjustment in the upper portion of the vehicle, as indicated at 16, adjacent one of the front windows 18.

The embodiment of the present invention which has been illustrated comprises an elongated, generally rectangular plate or panel 20 of suitable tinted transparent or translucent material. The panel 20 may also be of any suitable dimensions. Adjacent one of its longitudinal edges, the panel 20 has formed therein a pair of holes or openings 22. It is to be noted that the openings 22 are adjacent to but spaced from the ends 24 of the panel 20. It also is to be noted that the panel 20 is of less width than the visor 12.

For mounting the panel 20 on the visor 12 and for securing said panel in an inoperative position therebeneath, elastic bands 26 are provided. One end of the elastic bands 26 is held to form a short loop 28 which is inserted or threaded through one of the openings 22. The other ends of the elastic bands 26 are then inserted through the loops 28 to provide what may be considered slip knots or the like 30 and said bands are then pulled tight to provide elongated loops 32. The loops 32 are of a length to encircle the visor 12 under tension.

It is thought that the use of the device will be readily apparent from a consideration of the foregoing. Briefly, to mount the panel 20 on the visor 12 the loops 32 are slipped to the desired position on said visor from the end 34 thereof which is remote from the mounting arm or rod 14. The loops 32 are then slipped or adjusted circumferentially on the visor 12 as may be necessary to pivotally hang the panel 20 on the underside of said visor and adjacent the free longitudinal edge 36 thereof. Thus, when in use, the tinted panel 20 is adapted to hang by gravity in an operative position from the visor 12. As will be apparent, the panel 20 may be moved to various positions by adjusting the visor 12 in the usual manner. When the glare shield is not in use the panel 20 is swung upwardly beneath the visor 12 to the position of FIGURE 1 of the drawing. When in this position it will be observed that the free longitudinal edge of the relatively narrow panel 20 is spaced inwardly from the pivoted longitudinal edge of the visor 12. This spacing of the free longitudinal edge of the panel 20 from the pivoted longitudinal edge of the visor 12, in conjunction with the spacing of the openings 22 from the ends 24 of the panel 20, facilitates looping the lower runs or portions of the elastic loops 32 around said ends 24 in the manner shown for securing said panels in folded or inoperative position beneath the visor. This attaching and securing means constitute a highly important and desirable feature of the invention. With the panel 20 in the inoperative position shown, the accumulation of dust or dirt on said panel is substantially prevented. The panel 20, in its inoperative position on the visor 12, is also adapted to function as a mirror. The upper runs or portions of the elastic loops 32 may be utilized for retaining cards, etc., on top of the visor 12, if desired. Also if desired, but one of the bands 26 may be used for securing the panel 20 in inoperative position. To facilitate mounting the glare shield on a relatively short sun visor, an additional opening 38 is provided in the panel 20 adjacent to but in inwardly spaced relation to the right-hand opening 22 for the reception of the respective elastic band 26.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a horizontal elongated, vertically swingable sun visor including pivoted and free horizontal longitudinal edges, an elongated glare shield including a generally rectangular panel of a width appreciably less than the width of said visor and having a generally horizontal longitudinal edge portion with a pair of openings formed therein spaced from the opposite end of said panel, a pair of elastic bands transversely encircling the visor under tension and including means defining closed loops at said free edge spaced apart a distance substantially equal to the spacing between said openings and passed through said openings pivotally securing said panel to said visor for free swinging movement of said panel relative to said visor about an axis paralleling and disposed between said free edge of said visor and said longitudinal edge of said panel.

2. The combination of claim 1 wherein said loops comprise integral portions of said bands defining slip knots securing said bands to the panel through the openings.

References Cited by the Examiner

UNITED STATES PATENTS

| | | | |
|---|---|---|---|
| 1,595,442 | 8/26 | Allen | 296—97 X |
| 2,736,374 | 2/56 | Iverson | 296—97 X |
| 2,833,591 | 5/58 | Kurtzke | 296—97 |
| 2,842,395 | 7/58 | Davis | 296—97 |

A. HARRY LEVY, *Primary Examiner.*